(12) United States Patent
Zhang et al.

(10) Patent No.: US 11,917,437 B2
(45) Date of Patent: Feb. 27, 2024

(54) LAYER 1 MEASUREMENT REPORTING FOR NEIGHBOR CELL

(71) Applicant: QUALCOMM Incorporated, San Diego, CA (US)

(72) Inventors: Qian Zhang, Basking Ridge, NJ (US); Junyi Li, Franklin Park, NJ (US); Yan Zhou, San Diego, CA (US); Tianyang Bai, Somerville, NJ (US); Jung Ho Ryu, Fort Lee, NJ (US); Ling Ding, Chester, NJ (US); Kiran Venugopal, Raritan, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 17/195,312

(22) Filed: Mar. 8, 2021

(65) Prior Publication Data

US 2021/0289379 A1   Sep. 16, 2021

Related U.S. Application Data

(60) Provisional application No. 62/989,435, filed on Mar. 13, 2020.

(51) Int. Cl.
| | |
|---|---|
| H04J 3/14 | (2006.01) |
| H04L 43/50 | (2022.01) |
| H04L 43/00 | (2022.01) |
| H04B 17/00 | (2015.01) |
| H04W 24/00 | (2009.01) |
| H04W 24/10 | (2009.01) |
| H04L 5/00 | (2006.01) |

(52) U.S. Cl.
CPC ........... *H04W 24/10* (2013.01); *H04L 5/0048* (2013.01)

(58) Field of Classification Search
CPC .. H04W 24/10; H04W 36/0058; H04L 5/0048
USPC ........................................................ 370/241
See application file for complete search history.

(56) References Cited

U.S. PATENT DOCUMENTS

| | | | |
|---|---|---|---|
| 2016/0337916 A1* | 11/2016 | Deenoo | H04W 36/0094 |
| 2019/0109626 A1* | 4/2019 | Park | H04B 7/0636 |
| 2019/0215136 A1* | 7/2019 | Zhou | H04B 7/088 |

(Continued)

OTHER PUBLICATIONS

Intel (R4-1905761, Discussion on SCell activation delay in FR2, Reno, US, May 13-17, 2019) (Year: 2019).*

(Continued)

*Primary Examiner* — Maharishi V Khirodhar
(74) *Attorney, Agent, or Firm* — Arun Swain

(57) ABSTRACT

Various aspects of the present disclosure generally relate to wireless communication. In some aspects, a user equipment (UE) may perform a physical layer measurement on a non-serving cell of the UE. The UE may report a measurement value of the physical layer measurement to a serving cell of the UE based at least in part on the physical layer measurement satisfying a threshold. The UE may receive, based at least in part on reporting the physical layer measurement, a physical layer reference signal measurement configuration for the non-serving cell. The UE may transmit a measurement report based at least in part on the physical layer reference signal measurement configuration. Numerous other aspects are provided.

30 Claims, 8 Drawing Sheets

(56) References Cited

U.S. PATENT DOCUMENTS

| | | | | |
|---|---|---|---|---|
| 2019/0320355 | A1* | 10/2019 | Da Silva | H04L 1/0026 |
| 2020/0007195 | A1* | 1/2020 | Yiu | H04B 7/0408 |
| 2020/0275297 | A1* | 8/2020 | Jung | H04W 24/10 |
| 2020/0296613 | A1* | 9/2020 | Kim | H04W 72/23 |
| 2020/0322023 | A1* | 10/2020 | Kung | H04B 7/0626 |

OTHER PUBLICATIONS

Ericsson (R1-1912060, lower layer mobility enhancements, 2019) (Year: 2019).*

Ericsson (R4-1906888, On L1-RSRP reporting and TCI state activation at SCell activation, Reno, Nevada, US, May 13-17, 2019) (Year: 2019).*

3GPP TSG-RAN WG4 Meeting #90bis R4-1902906, Xian, China, Apr. 8-12, 2019, Intel Corporation. (Year: 2019).*

B. 3GPP TSG-RAN WG4 Meeting #90-Bis R4-1903622, Xi'an, China, Apr. 8-Apr. 12, 2019 , Title: SCell activation delay in FR2 band, Source: NEC (Year: 2019).*

C. 3GPP TSG RAN WG4 Meeting #90bis R4-1904307, Xi'an, China, Apr. 8-12, 2019, Source: Ericsson, Title: On TCI state selection at SCell activation of first cell in FR2 band. (Year: 2019).*

Ericson (R4-1904309, Apr. 8-12, 2019) (Year: 2019).*

Ericsson: "Lower-Layer Mobility Enhancements", 3GPP TSG-RAN WG1 Meeting #99, 3GPP Draft, Tdoc R1-1912060, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, pp. 1-11, Nov. 8, 2019 (Nov. 8, 2019), XP051819934, Retrieved from the Internet: URL: https://ftp.3gpp.org/tsg_ran/WG1_RL1/TSGR1_99/Docs/R1-1912060.zip R1-1912060 Lower-layer mobility enhancements.docx [retrieved on Nov. 8, 2019] abstract p. 3, Observation 3, sections 2, 2.1, 2.2.

Intel Corporation: "Discussion on Multi-Beam Enhancements", 3GPP Draft, 3GPP TSG RAN WG1 #98bis, R1-1910669, Discussion on Multi-Beam Enhancements, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 18, 2019, Oct. 5, 2019 (Oct. 5, 2019), XP051808634, 10 Pages, Retrieved from the Internet: URL: https://ftp.3gpp.org/tsg_ran/WG1_RL1/TSGR1_98b/Docs/R1-1910669.zip. R1-1910669 Discussion on multi-beam enhancements .docx [retrieved on Oct. 5, 2019] p. 6-p. 7.

International Search Report and Written Opinion—PCT/US2021/021463—ISA/EPO—Jun. 10, 2021.

Nokia, et al., "Enhancements on Multi-Beam Operation", 3GPP TSG RAN WG1 #103-e, 3GPP Draft; R1-2008903, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 23, 2020-Nov. 13, 2020, 31 Pages, Oct. 24, 2020 (Oct. 24, 2020), XP051946720, Retrieved from the Internet: URL: https://ftp.3gpp.org/tsg_ran/WG1_RL1/TSGR1_103-e/Docs/R1-2008903.zip R1-2008903 Multi-Beam Enhancements_Rel17.docx [retrieved on Oct. 24, 2020] section 2.2.3.

NTT DOCOMO, et al., "Discussion on Mobility Procedure for NR", 3GPP TSG RAN WG1 Meeting #88, 3GPP Draft, R1-1702833_Discussion on Mobility Procedure for NR_Final, 3rd Generation Partnership Project (3GPP), Mobile Competence Centre, 650, Route Des Lucioles, F-06921 Sophia-Antipolis Cedex, France, vol. Ran WG1, No. Athens, Greece, Feb. 13, 2017- Feb. 17, 2017, Feb. 12, 2017, XP051209978, 6 Pages, Retrieved from the Internet: URL: http://www.3gpp.org/ftp/Meetings_3GPP_SYNC/RAN1/Docs/ [retrieved on Feb. 12, 2017].

* cited by examiner

LAYER 1 MEASUREMENT REPORTING FOR NEIGHBOR CELL

CROSS-REFERENCE TO RELATED APPLICATION

This patent application claims priority to U.S. Provisional Patent Application No. 62/989,435, filed on Mar. 13, 2020, entitled "LAYER 1 MEASUREMENT REPORTING FOR NEIGHBOR CELL," and assigned to the assignee hereof. The disclosure of the prior application is considered part of and is incorporated by reference into this patent application.

FIELD OF THE DISCLOSURE

Aspects of the present disclosure generally relate to wireless communication and specifically, to techniques and apparatuses for Layer 1 measurement reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

A UE may perform a measurement on a cell, and may report a measurement value to a serving cell of the UE. For example, the measured cell may be a neighbor cell of the UE, and the UE may perform the measurement for purposes of identifying a suitable handover target, identifying a suitable secondary cell, performing cell selection or reselection, or for another purpose. The speed of such operations may be improved by performing physical-layer measurements, also referred to as Layer 1 measurements. A physical-layer measurement may be configured in the physical layer, as compared to a Layer 3 measurement, which may be configured in the radio resource control layer. A physical-layer measurement may involve a shorter measurement period, less higher-layer involvement, and less resource utilization by the measuring device than a higher-layer measurement such as a Layer 3 measurement. The transmission of measurement reporting for physical-layer measurements may involve significant overhead, particularly if physical-layer measurements are reported with more frequency than higher-layer measurements, as may occur in some deployments.

SUMMARY

In some aspects, a method of wireless communication, performed by a user equipment (UE), may include performing a physical layer measurement on a non-serving cell of the UE. The method may include reporting a measurement value of the physical layer measurement to a serving cell of the UE based at least in part on the physical layer measurement satisfying a threshold. The method may include receiving, based at least in part on reporting the measurement value of the physical layer measurement, a physical layer reference signal measurement configuration for the non-serving cell. The method may include transmitting a measurement report based at least in part on the physical layer reference signal measurement configuration.

In some aspects, a method of wireless communication, performed by a base station associated with a serving cell of a UE, may include receiving information identifying a measurement value of a physical layer measurement performed by the UE on a non-serving cell of the UE based at least in part on the physical layer measurement satisfying a threshold. The method may include transmitting, to the UE based at least in part on the UE reporting the measurement value, a physical layer reference signal measurement configuration for the non-serving cell. The method may include receiving a measurement report based at least in part on the physical layer reference signal measurement configuration.

In some aspects, a UE for wireless communication may include a memory and one or more processors operatively coupled to the memory. The memory and the one or more processors may be configured to perform a physical layer measurement on a non-serving cell of the UE. The memory and the one or more processors may be configured to report a measurement value of the physical layer measurement to a serving cell of the UE based at least in part on the physical layer measurement satisfying a threshold. The memory and the one or more processors may be configured to receive, based at least in part on reporting a measurement value of the physical layer measurement, a physical layer reference signal measurement configuration for the non-serving cell. The memory and the one or more processors may be configured to transmit a measurement report based at least in part on the physical layer reference signal measurement configuration.

In some aspects, a base station for wireless communication may include a memory and one or more processors operatively coupled to the memory. The memory and the one or more processors may be configured to receive information identifying a measurement value of a physical layer measurement performed by the UE on a non-serving cell of the UE based at least in part on the physical layer measurement satisfying a threshold. The memory and the one or more processors may be configured to transmit, to the UE based at least in part on the UE reporting a measurement value of the physical layer measurement, a physical layer reference signal measurement configuration for the non-serving cell. The memory and the one or more processors may be configured to receive a measurement report based at least in part on the physical layer reference signal measurement configuration.

In some aspects, a non-transitory computer-readable medium may store one or more instructions for wireless communication. The one or more instructions, when executed by one or more processors of a UE, may cause the one or more processors to perform a physical layer measurement on a non-serving cell of the UE. The one or more instructions, when executed by one or more processors of the UE, may cause the one or more processors to report a measurement value of the physical layer measurement to a serving cell of the UE based at least in part on the physical layer measurement satisfying a threshold. The one or more instructions, when executed by one or more processors of the UE, may cause the one or more processors to receive, based at least in part on reporting a measurement value of the physical layer measurement, a physical layer reference signal measurement configuration for the non-serving cell. The one or more instructions, when executed by one or more processors of the UE, may cause the one or more processors to transmit a measurement report based at least in part on the physical layer reference signal measurement configuration.

In some aspects, a non-transitory computer-readable medium may store one or more instructions for wireless communication. The one or more instructions, when executed by one or more processors of a base station, may cause the one or more processors to receive information identifying a measurement value of a physical layer measurement performed by a UE on a non-serving cell of the UE based at least in part on the physical layer measurement satisfying a threshold. The one or more instructions, when executed by one or more processors of the base station, may cause the one or more processors to transmit, to the UE based at least in part on the UE reporting a measurement value of the physical layer measurement, a physical layer reference signal measurement configuration for the non-serving cell. The one or more instructions, when executed by one or more processors of the base station, may cause the one or more processors to receive a measurement report based at least in part on the physical layer reference signal measurement configuration.

In some aspects, an apparatus for wireless communication may include means for performing a physical layer measurement on a non-serving cell of the UE. The apparatus may include means for reporting a measurement value of the physical layer measurement to a serving cell of a UE based at least in part on the physical layer measurement satisfying a threshold. The apparatus may include means for receiving, based at least in part on reporting a measurement value of the physical layer measurement, a physical layer reference signal measurement configuration for the non-serving cell. The apparatus may include means for transmitting a measurement report based at least in part on the physical layer reference signal measurement configuration.

In some aspects, an apparatus for wireless communication may include means for receiving information identifying a measurement value of a physical layer measurement performed by a UE on a non-serving cell of the UE based at least in part on the physical layer measurement satisfying a threshold. The apparatus may include means for transmitting, to the UE based at least in part on the UE reporting a measurement value of the physical layer measurement, a physical layer reference signal measurement configuration for the non-serving cell. The apparatus may include means for receiving a measurement report based at least in part on the physical layer reference signal measurement configuration.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
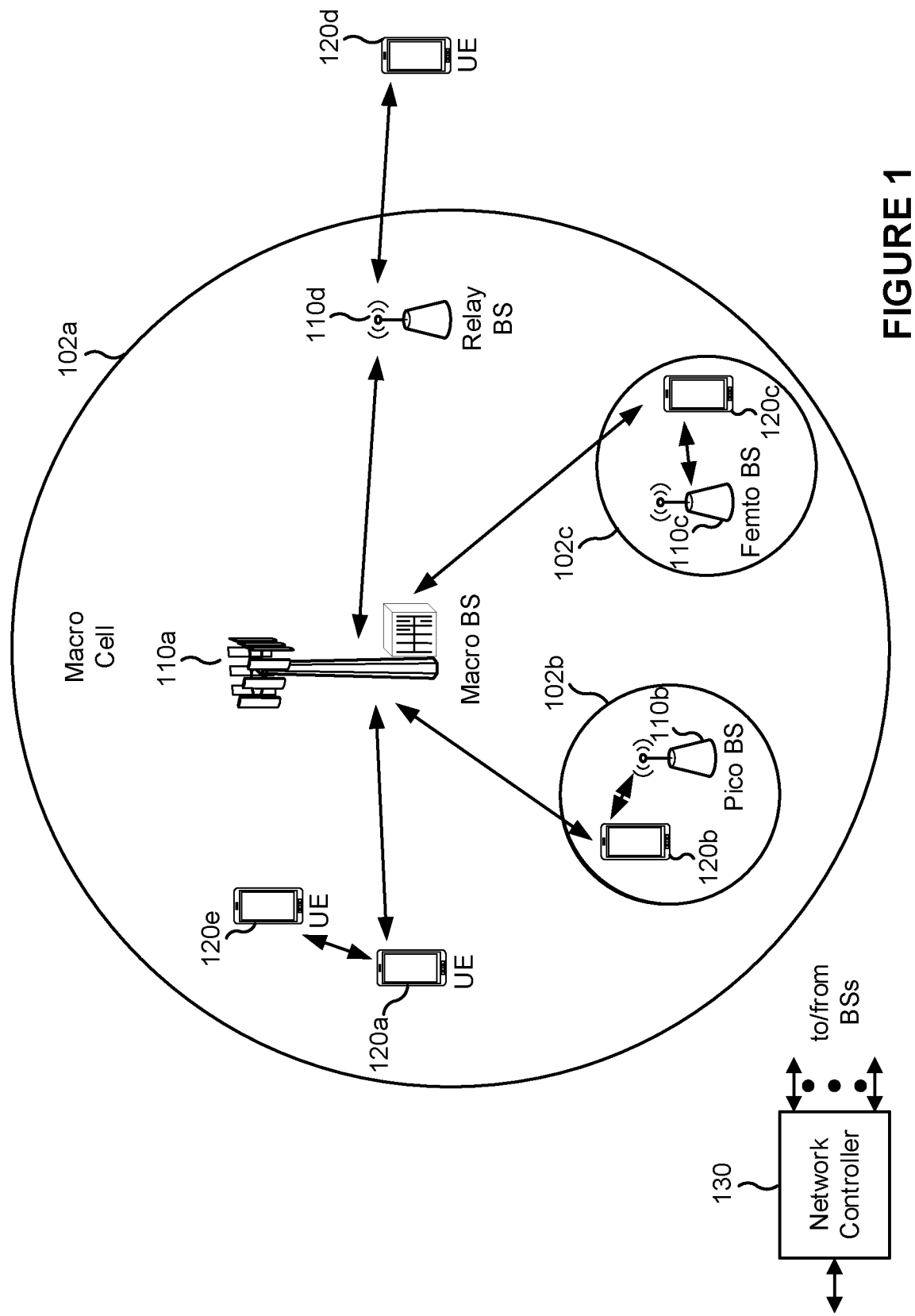
FIG. 1 is a diagram illustrating an example wireless network in accordance with the present disclosure.

Various aspects of the disclosure are described more fully hereinafter with reference to the accompanying drawings.

This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

A UE may perform a measurement on a cell, and may report a measurement value to a serving cell of the UE. For example, the measured cell may be a neighbor cell of the UE, and the UE may perform the measurement for purposes of identifying a suitable handover target, identifying a suitable secondary cell, performing cell selection or reselection, or for another purpose. The speed of such operations may be improved by performing physical-layer measurements, also referred to as Layer 1 measurements. A physical-layer measurement may be configured and performed in the physical layer, as compared to a Layer 3 measurement, which may be configured in the radio resource control layer. A physical-layer measurement may involve a shorter measurement period, less higher-layer involvement, and less resource utilization by the measuring device than a higher-layer measurement such as a Layer 3 measurement. However, the transmission of measurement reporting for physical-layer measurements may involve significant overhead, particularly if physical-layer measurements are reported with more frequency than higher-layer measurements, as may occur in some deployments.

Various aspects relate generally to reduction of overhead for signaling of physical-layer measurement reporting for a cell (such as a neighbor cell). Some aspects more specifically relate to the selective signaling (or skipping signaling) of information identifying a measurement value by a UE based at least in part on whether the measurement value satisfies a threshold. For example, the threshold may be configured by a base station and signaled to the UE, or may be specified, such as in a wireless communication standard. The threshold could be based at least in part on a measured signal strength for one or more reference signals. Some aspects provide for omission, in a channel state information reference signal (CSI-RS) measurement report, of a cell identifier associated with a cell for which a measurement value was previously reported, which also enables overhead reduction of signaling related to physical-layer measurement information. For example, a base station may determine that the CSI-RS measurement report is associated with a cell (such as a neighbor cell) for which the base station has previously received measurement reporting.

Particular aspects of the subject matter described in this disclosure can be implemented to realize one or more of the following potential advantages. In some examples, the described techniques can be used to reduce overhead associated with physical-layer measurement reporting and subsequent CSI-RS measurement reports. Reducing overhead may conserve signaling resources of the UE and the base station, such as air interface resources, antenna resources, computing resources, and so on. This may be particularly beneficial in a situation in which a UE is performing rapid feedback regarding measurements on neighbor cells or CSI-RSs, such as in high mobility scenarios, small cell scenarios, and Layer 1 or Layer 2 centric inter-cell mobility scenarios.

FIG. 1 is a diagram illustrating an example wireless network in accordance with the present disclosure. The wireless network may be or may include elements of a 5G (NR) network or a Long Term Evolution (LTE) network, among other examples. The wireless network may include a quantity of base stations (BSs) 110 (shown as BS 110*a*, BS 110*b*, BS 110*c*, and BS 110*d*) and other network entities. A BS is an entity that communicates with user equipment (UE(s)) and may also be referred to as a Node B, an eNodeB, an eNB, a gNB, an NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A network controller 130 may couple to the set of BSs 102*a*, 102*b*, 110*a* and 110*b*, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
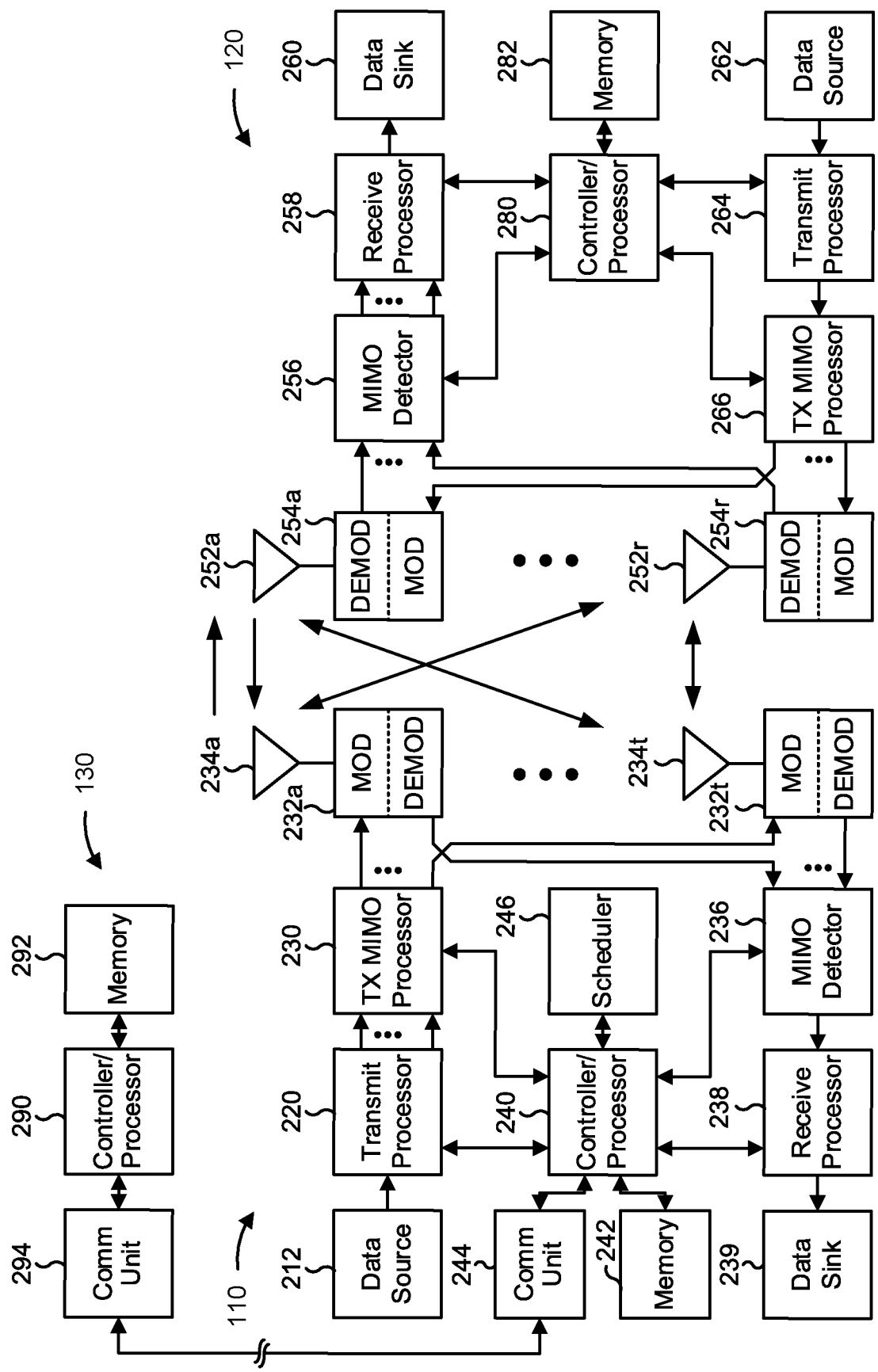
FIG. 2 is a diagram illustrating an example base station (BS) in communication with a user equipment (UE) in a wireless network in accordance with the present disclosure.

FIG. 2 is a diagram illustrating an example base station (BS) in communication with a user equipment (UE) in a wireless network in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS) or a demodulation reference signal (DMRS)) and synchronization signals (for example, a primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM), among other examples, or combinations thereof), and transmitted to base station 110. In some aspects, a modulator and a demodulator (e.g., MOD/DEMOD 254) of the UE 120 may be included in a modem of the UE 120. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. Network controller 130 may include communication unit 294, controller/processor 290, and memory 292.

Controller/processor 240 of base station 110, controller/processor 280 of UE 120, or any other component(s) of FIG. 2 may perform one or more techniques associated with Layer 1 measurement reporting for a neighbor cell, as described in more detail elsewhere herein. For example, controller/processor 240 of base station 110, controller/processor 280 of UE 120, or any other component(s) of FIG. 2 may perform or direct operations of, for example, process 400 of FIG. 4, process 500 of FIG. 5, or other processes as described herein. Memories 242 and 282 may store data and program codes for base station 110 and UE 120, respectively. A scheduler 246 may schedule UEs for data transmission on the downlink or uplink.

In some aspects, UE 120 may include means for performing a physical layer measurement on a non-serving cell of UE 120; means for reporting a measurement value of the physical layer measurement to a serving cell of the UE based at least in part on the measurement value or the physical layer measurement satisfying a threshold; means for receiving, based at least in part on reporting the measurement value, a physical layer reference signal measurement configuration for the non-serving cell; means for transmitting a measurement report based at least in part on a physical layer reference signal measurement configuration; means for receiving a configuration indicating the threshold via at least one of: radio resource control signaling, medium access control signaling, or downlink control information; means for receiving downlink control information that schedules a resource for the measurement report and that provides the physical layer reference signal measurement configuration; means for receiving first downlink control information (DCI) scheduling a resource for the measurement report and second DCI indicating the physical layer reference signal measurement configuration; means for determining a resource for the measurement report relative to a measurement window associated with the physical layer reference signal measurement configuration based at least in part on a time gap indicated by a wireless communication standard; among other examples, or combinations thereof. In some aspects, such means may include one or more components of UE 120 described in connection with FIG. 2.

In some aspects, base station 110 may include means for receiving information identifying a measurement value of a physical layer measurement performed by a UE on a non-serving cell of the UE based at least in part on the physical layer measurement or the measurement value satisfying a threshold; means for transmitting, to the UE based at least in part on the UE reporting the measurement value or the physical layer measurement, a physical layer reference signal measurement configuration for the cell; means for receiving a measurement report based at least in part on the physical layer reference signal measurement configuration; means for determining that the measurement report is associated with the cell based at least in part on having received the information identifying the measurement value or the physical layer measurement associated with the cell; means for configuring the threshold via at least one of: radio resource control signaling, medium access control signaling, or DCI; means for transmitting first DCI that schedules a resource for the measurement report and second DCI that indicates the physical layer reference signal measurement configuration; means for transmitting DCI that indicates the physical layer reference signal measurement configuration; means for receiving the measurement report via a physical uplink control channel; means for transmitting DCI that schedules a resource for the measurement report and that provides the physical layer reference signal measurement configuration; and means for determining a resource for the measurement report relative to a measurement window associated with the physical layer reference signal measurement configuration based at least in part on a time gap indicated by a wireless communication standard; among other examples, or combinations thereof. In some aspects, such means may include one or more components of base station 110 described in connection with FIG. 2.

Figure 3:
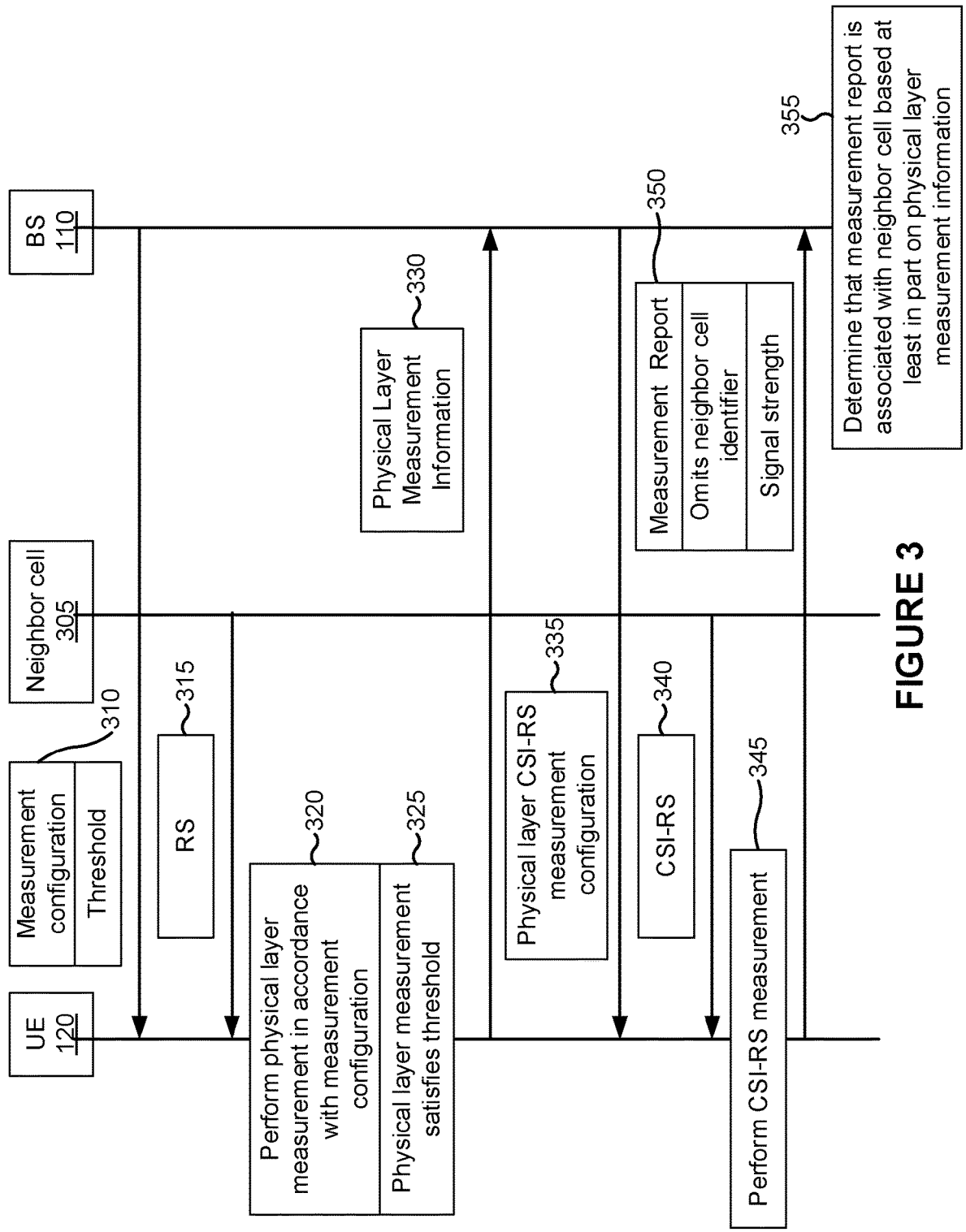
FIG. 3 is a diagram illustrating an example of signaling associated with physical-layer measurement of a neighbor cell in accordance with the present disclosure.

FIG. 3 is a diagram illustrating an example of signaling associated with physical-layer measurement of a neighbor cell, in accordance with the present disclosure. As shown, FIG. 3 includes a UE 120, a BS 110, and a neighbor cell 305. The neighbor cell 305 may be provided by the BS 110 or by another BS other than the BS 110. In some aspects, the BS 110 may provide a serving cell of the UE 120. In some aspects, the operations described with regard to FIG. 3 may be performed with regard to any non-serving cell of a UE 120. In other words, the neighbor cell 305 may not necessarily be a neighbor cell of a cell provided by the BS 110. In some aspects, the neighbor cell 305 may be identified based at least in part on a physical cell identifier (PCI). For example, communication on the neighbor cell 305 may occur via a beam that is associated with the PCI. A cell may be configured with multiple SSB/CSI-RS beams, such as 64 beams, 128 beams, or the like.

A neighbor cell is a cell identified by a neighbor cell list of the UE 120. For example, the neighbor cell list may identify a list of cells that are considered for cell reselection, handover, Layer 1/Layer 2 inter-cell mobility operations, or the like. In some aspects, the neighbor cell may identify cells for which the UE 120 is to transmit measurement reporting.

In a first operation 310, the BS 110 may transmit a measurement configuration to the UE 120. The measurement configuration may identify a configuration for a physical layer measurement on the neighbor cell 305. In some aspects, the measurement configuration may identify a measurement gap for the physical layer measurement. A measurement gap may provide time for the UE 120 to tune from a starting frequency (such as a frequency associated with the BS 110 and the serving cell) to a target frequency (such as a frequency associated with the neighbor cell 305). In some aspects, the measurement configuration may identify a configured duration for the physical layer measurement. For example, the measurement configuration may indicate a time window in which to perform the physical layer measurement or a length of time for which the physical layer measurement is to be performed. In some aspects, the measurement configuration may be provided to the UE using radio resource control (RRC) signaling, medium access control (MAC) signaling (such as a MAC control element (MAC-CE)), DCI, or another form of signaling. In some aspects, the measurement configuration may indicate a signal for which the physical layer measurement is to be performed. For example, the signal may be a reference signal, such as a synchronization signal/physical broadcast channel block (SSB), a channel state information reference signal (CSI-RS), or another form of reference signal.

As further shown, the measurement configuration may be associated with a threshold. In some aspects, as shown, the BS 110 may provide information identifying the threshold to the UE 120 using RRC signaling, MAC signaling, DCI, or another form of signaling. In some aspects, the threshold may be defined by a wireless communication standard (such as a 3GPP Technical Specification or another standard). In some aspects, the information identifying the threshold may indicate that the UE should compare a measurement value to the threshold to determine whether or not the measurement value should be reported to the BS 110. In other aspects, the information identifying the threshold may not explicitly indicate that the UE should compare the measurement value to the threshold, and the UE may determine to compare the measurement value to the threshold based at least in part on a pre-configuration of the UE, a rule in a wireless communication standard, or the like.

By configuring the UE 120 to selectively report, or not report, a measurement value in accordance with the threshold, overhead associated with measurement reporting for non-serving cells is reduced. For example, the UE 120 may only report a measurement value when the measurement value satisfies the threshold, and may not otherwise report the measurement value, which reduces overhead associated with measurement reporting when further action is unlikely to be triggered by the measurement reporting. In some aspects, described below, the BS 110 may configure the UE 120 to perform another measurement on a neighbor cell based at least in part on receiving the measurement value. For example, the BS 110 may configure the UE 120 to perform an L1 CSI-RS measurement on the neighbor cell. The reporting associated with such an L1 CSI-RS measurement may have reduced overhead relative to a baseline L1 CSI-RS measurement, since the BS 110 can determine that the reporting is associated with the UE 120 or the neighbor cell based at least in part on having received the measurement value associated with the initial measurement configuration. Thus, the UE 120 can selectively report an initial measurement value (such as based at least in part on the measurement configuration of the first operation 310) only if the initial measurement value satisfies a threshold, and then the BS 110 can configure or trigger further measurement on a neighbor cell based at least in part on the reporting of the initial measurement value.

The threshold may be a measurement value threshold. If a determined measurement value of the physical layer measurement satisfies the measurement value threshold, then the UE 120 may transmit information identifying the measurement value of the physical layer measurement to the BS 110. If a determined measurement value of the physical layer measurement fails to satisfy the measurement value threshold, then the UE 120 may determine that the information identifying the measurement value is not to be transmitted to the BS 110 (e.g., may skip transmission of a measurement report identifying the determined measurement value). Thus, the UE 120 may report only measurement values that satisfy the threshold, thereby conserving communication and computing resources that would otherwise be used to perform such reporting indiscriminately.

In some aspects, the threshold may be based at least in part on which measurement value is determined by the physical layer measurement (for example, which measurement value is indicated by a reporting format of a measurement configuration for the measurement value). In some aspects, the threshold may be an absolute value of the measurement value. For example, the measurement value may be a reference signal received power (RSRP), reference signal received quality (RSRQ), signal to interference plus noise ratio (SINR), or the like. In some aspects, the threshold may be defined as a relative value, such as "within X dB of the strongest beam or the serving cell's beam". In just one example, the threshold for an RSRP measurement value determined for an SSB may be between −80 and −70 dBm, or 3 dB lower than the serving cell's strongest SSB.

In some aspects, the threshold may be configured by the BS 110. For example, the BS 110 may provide configuration information indicating the threshold, such as in the measurement configuration described above. In some aspects, the threshold may be signaled to one or more UEs in a UE-specific fashion. In some aspects, the threshold may be defined in a rule of a wireless communication standard.

In a second operation 315, the neighbor cell 305 may transmit a reference signal (RS). In a third operation 320, the UE 120 may perform the physical layer measurement on the RS based at least in part on the measurement configuration. For example, the UE 120 may use a measurement gap or a configured duration specified by the measurement configuration to perform the physical layer measurement, and may perform the physical layer measurement to determine a measurement value specified by the measurement configuration on the RS specified by the measurement configuration. For example, the measurement value may be in terms of RSRP, RSRQ, SINR, or the like. In a fourth operation 325, the UE 120 may determine that the physical layer measurement (or the measurement value determined by the physical layer measurement) satisfies the threshold. In a fifth operation, the UE 120 may transmit information 330 identifying the measurement value of the physical layer measurement. For example, the information 330 may be a measurement report that identifies the measurement value. In some aspects, the UE 120 may transmit the information 330 based at least in part on determining that the physical layer measurement satisfies the threshold. If the physical layer measurement failed to satisfy the threshold, then the UE 120 may not transmit the information 330, thereby conserving computing and communication resources relative to indiscriminately transmitting the information 330.

In a sixth operation, the BS 110 may transmit a physical layer CSI-RS measurement configuration 335. The physical layer CSI-RS measurement configuration 335 may identify a configuration for performing a measurement on a reference signal, such as a Layer 1 CSI-RS measurement on a CSI-RS transmitted via the neighbor cell 305. In some aspects, the physical layer CSI-RS measurement configuration 335 may be for a form of reference signal other than a CSI-RS, such as an SSB or a different form of RS. In some aspects, the BS 110 may transmit the physical layer CSI-RS measurement configuration 335 using DCI, RRC signaling, MAC signaling, or another form of signaling.

In some aspects, the physical layer CSI-RS measurement configuration 335 may be transmitted with the measurement configuration associated with the first operation 310 (such as in the same DCI, the same physical channel, the same configuration signaling, or the same signal). In some aspects, as shown, the physical layer CSI-RS measurement configuration 335 may be transmitted separately from the measurement configuration associated with the first operation 310 (such as in different DCI, different physical channels, different configuration signaling, or different signals). In some aspects, the BS 110 may transmit the physical layer CSI-RS measurement configuration 335 based at least in part on receiving the information 330 regarding the neighbor cell 305. For example, the BS 110 may transmit a physical layer CSI-RS measurement configuration for a neighbor cell based at least in part on receiving information identifying a measurement value of a physical layer measurement for the neighbor cell. For example, receiving the information identifying the measurement value of the physical layer measurement for the neighbor cell may trigger the BS 110 to transmit the physical layer CSI-RS measurement configuration for the neighbor cell.

In a seventh operation, the UE 120 may receive a CSI-RS 340 from the neighbor cell 305. In an eighth operation 345, the UE 120 may perform a CSI-RS measurement (such as a physical layer CSI-RS measurement) on the CSI-RS 340. For example, the UE 120 may perform the CSI-RS measurement based at least in part on parameters specified by the physical layer CSI-RS measurement configuration 335.

In a ninth operation, the UE 120 may transmit a measurement report 350 to the BS 110. The measurement report 350 may identify a measurement value for the neighbor cell 305, such as a signal strength (which may include an RSRP, an RSRQ, an SINR, or another measurement) or another form of measurement value based at least in part on which physical layer measurement was performed with regard to the neighbor cell 305. For example, the measurement report 350 may include one or more bits (such as N bits, where N is an integer greater than zero) indicating the signal strength.

In some aspects, the UE 120 may transmit the measurement report 350 via a physical uplink control channel (PUCCH). In some aspects, a resource associated with the PUCCH may be scheduled by the same DCI that provides the physical layer CSI-RS measurement configuration 335. In some aspects, a resource associated with the PUCCH may be scheduled by different DCI than DCI that provides the physical layer CSI-RS measurement configuration 335. In some aspects, a resource associated with the PUCCH may be defined based at least in part on a rule, such as a rule specified in a wireless communication standard (such as a 3GPP Technical Specification). For example, the rule may indicate a time gap between a measurement window associated with the physical layer CSI-RS measurement configuration 335 and a transmission time or resource of the measurement report 350. More particularly, the rule may indicate that the measurement report 350 of the neighbor cell 305's measurement value may be transmitted via a PUCCH in a slot that is X slots after a configured CSI-RS measurement window (such as indicated by the physical layer CSI-RS measurement configuration 335.

As shown, in some aspects, the measurement report 350 may omit information identifying the neighbor cell 305 (such as a PCI associated with the neighbor cell 305). In a tenth operation 355, the BS 110 may determine that the measurement report is associated with the neighbor cell 305 based at least in part on the information 330 identifying the measurement value of the physical layer measurement. For example, the BS 110 may determine that the measurement report is associated with the neighbor cell 305 based at least in part on having received the information 330. As another example, the BS 110 may determine that the measurement report is associated with the neighbor cell 305 based at least in part on having transmitted the physical layer CSI-RS measurement configuration 335 for the neighbor cell 305 responsive to the information 330. As yet another example, the BS 110 may determine that the measurement report is associated with the neighbor cell 305 based at least in part on the information 330, such as based at least in part on a PCI associated with the neighbor cell 305 included in the information 330. In this way, overhead associated with explicitly signaling the information identifying the neighbor cell 305 in the measurement report 350 is reduced.

In some aspects, the operations 335, 340, 345, and 350 can be repeated one or more times, such as iteratively.

Figure 4:
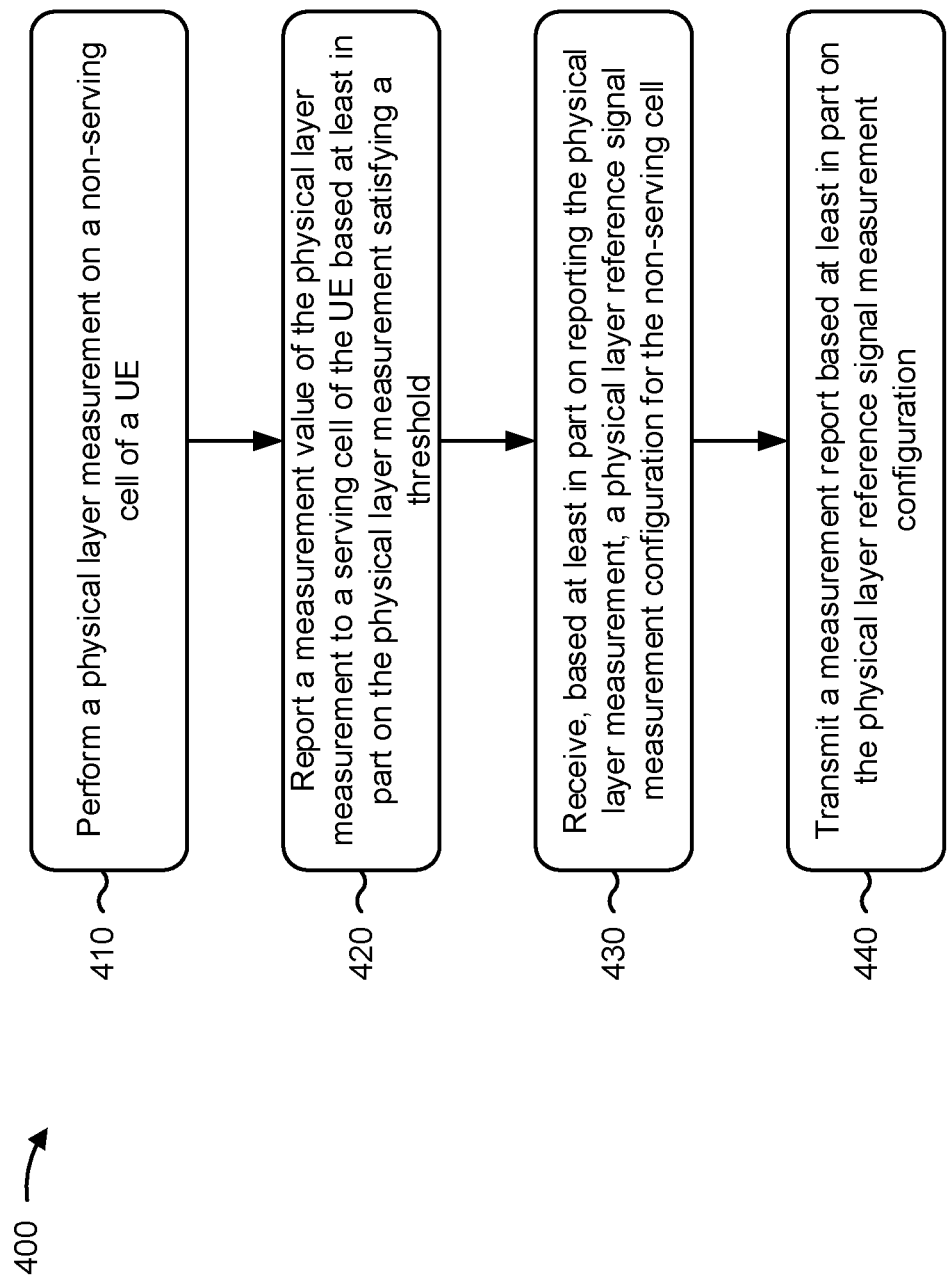
FIG. 4 is a flowchart illustrating an example process for Layer 1 measurement reporting performed by a UE in accordance with the present disclosure.

FIG. 4 is a flowchart illustrating an example process 400 performed, for example, by a UE in accordance with the present disclosure. Example process 400 is an example where the UE (for example, UE 120, among other examples) performs operations associated with Layer 1 measurement reporting for neighbor cell.

As shown in FIG. 4, in some aspects, process 400 may include performing a physical layer measurement on a non-serving cell of the UE (block 410). For example, the UE (such as by using antenna 252, DEMOD 254, MIMO detector 256, receive processor 258, or controller/processor 280) may perform a physical layer measurement on a non-serving cell of the UE (such as a neighbor cell 305), as described above.

As further shown in FIG. 4, in some aspects, process 400 may include reporting a measurement value of the physical layer measurement to a serving cell of the UE based at least in part on the physical layer measurement satisfying a threshold (block 420). For example, the UE (such as by using controller/processor 280, transmit processor 264, TX MIMO processor 266, MOD 254, or antenna 252) may report the measurement value to a serving cell of the UE (such as provided by a BS 110) based at least in part on the physical layer measurement satisfying a threshold, as described above. It should be understood that "the physical layer measurement satisfying a threshold" is synonymous with "a measurement value determined by the physical layer measurement satisfying a threshold."

As further shown in FIG. 4, in some aspects, process 400 may include receiving, based at least in part on reporting the physical layer measurement, a physical layer reference signal measurement configuration for the non-serving cell (block 430). For example, the UE (such as by using antenna 252, DEMOD 254, MIMO detector 256, receive processor 258, or controller/processor 280) may receive, based at least in part on reporting the physical layer measurement, a physical layer reference signal measurement configuration for the non-serving cell, as described above. In some aspects, the physical lay reference signal measurement configuration may be a physical layer CSI-RS measurement configuration, such as shown at 335 in FIG. 3.

As further shown in FIG. 4, in some aspects, process 400 may include transmitting a measurement report based at least in part on the physical layer reference signal measurement configuration (block 440). For example, the UE (such as by using controller/processor 280, transmit processor 264, TX MIMO processor 266, MOD 254, or antenna 252) may transmit a measurement report based at least in part on the physical layer reference signal measurement configuration, as described above.

Process 400 may include additional aspects, such as any single aspect or any combination of aspects described below or in connection with one or more other processes described elsewhere herein.

In a first aspect, the measurement report omits information identifying the non-serving cell based at least in part on the UE having reported the measurement value to the serving cell.

In a second additional aspect, alone or in combination with the first aspect, the non-serving cell is a neighbor cell of the UE.

In a third additional aspect, alone or in combination with one or more of the first and second aspects, performing the physical layer measurement includes tuning from a frequency of the serving cell to a frequency of a reference signal measurement during a measurement gap or a configured duration associated with physical-layer measurement on the non-serving cell; and performing the reference signal measurement at the frequency.

In a fourth additional aspect, alone or in combination with one or more of the first through third aspects, the reference signal measurement is performed on a synchronization signal block.

In a fifth additional aspect, alone or in combination with one or more of the first through fourth aspects, process 400 includes receiving a configuration indicating the threshold via at least one of: radio resource control signaling, medium access control signaling, or downlink control information.

In a sixth additional aspect, alone or in combination with one or more of the first through fifth aspects, the threshold is specified in a wireless communication standard.

In a seventh additional aspect, alone or in combination with one or more of the first through sixth aspects, the physical layer reference signal measurement configuration is associated with measuring a channel state information reference signal.

In an eighth additional aspect, alone or in combination with one or more of the first through seventh aspects, receiving the physical layer reference signal measurement configuration includes receiving downlink control information that indicates the physical layer reference signal measurement configuration.

In a ninth additional aspect, alone or in combination with one or more of the first through eighth aspects, transmitting the measurement report includes transmitting a physical uplink control channel that includes the measurement report.

In a tenth additional aspect, alone or in combination with one or more of the first through ninth aspects, process 400 includes receiving downlink control information that schedules a resource for the measurement report and that provides the physical layer reference signal measurement configuration.

In an eleventh additional aspect, alone or in combination with one or more of the first through tenth aspects, process 400 includes receiving first downlink control information (DCI) indicating the physical layer reference signal measurement configuration and second DCI scheduling a resource for the measurement report.

In a twelfth additional aspect, alone or in combination with one or more of the first through eleventh aspects, process 400 includes determining a resource for the measurement report relative to a measurement window associated with the physical layer reference signal measurement configuration based at least in part on a time gap indicated by a wireless communication standard.

In a thirteenth additional aspect, alone or in combination with one or more of the first through twelfth aspects, the measurement report identifies a signal strength of the non-serving cell.

In a fourteenth additional aspect, alone or in combination with one or more of the first through thirteenth aspects, transmitting the measurement report includes transmitting a physical uplink control channel that identifies the signal strength.

In a fifteenth additional aspect, alone or in combination with one or more of the first through fourteenth aspects, the signal strength is identified by at least one of: a reference signal received power value, a reference signal received quality value, or a signal to interference plus noise ratio.

In a sixteenth additional aspect, alone or in combination with one or more of the first through fifteenth aspects, the threshold is a measurement value threshold and the process 400 further comprises comparing the measurement value of the physical layer measurement to the measurement value threshold, wherein reporting the measurement value is based at least in part on the measurement value satisfying the measurement value threshold.

In a seventeenth additional aspect, alone or in combination with one or more of the first through sixteenth aspects, the measurement value threshold is defined relative to a measurement value of a strongest beam associated with the UE or a measurement value of a beam associated with the serving cell of the UE.

In an eighteenth additional aspect, alone or in combination with one or more of the first through seventeenth aspects, the measurement value threshold is configured as a measurement value.

Although FIG. 4 shows example blocks of process 400, in some aspects, process 400 may include additional blocks, fewer blocks, different blocks, or differently arranged blocks than those depicted in FIG. 4. Additionally or alternatively, two or more of the blocks of process 400 may be performed in parallel.

Figure 5:
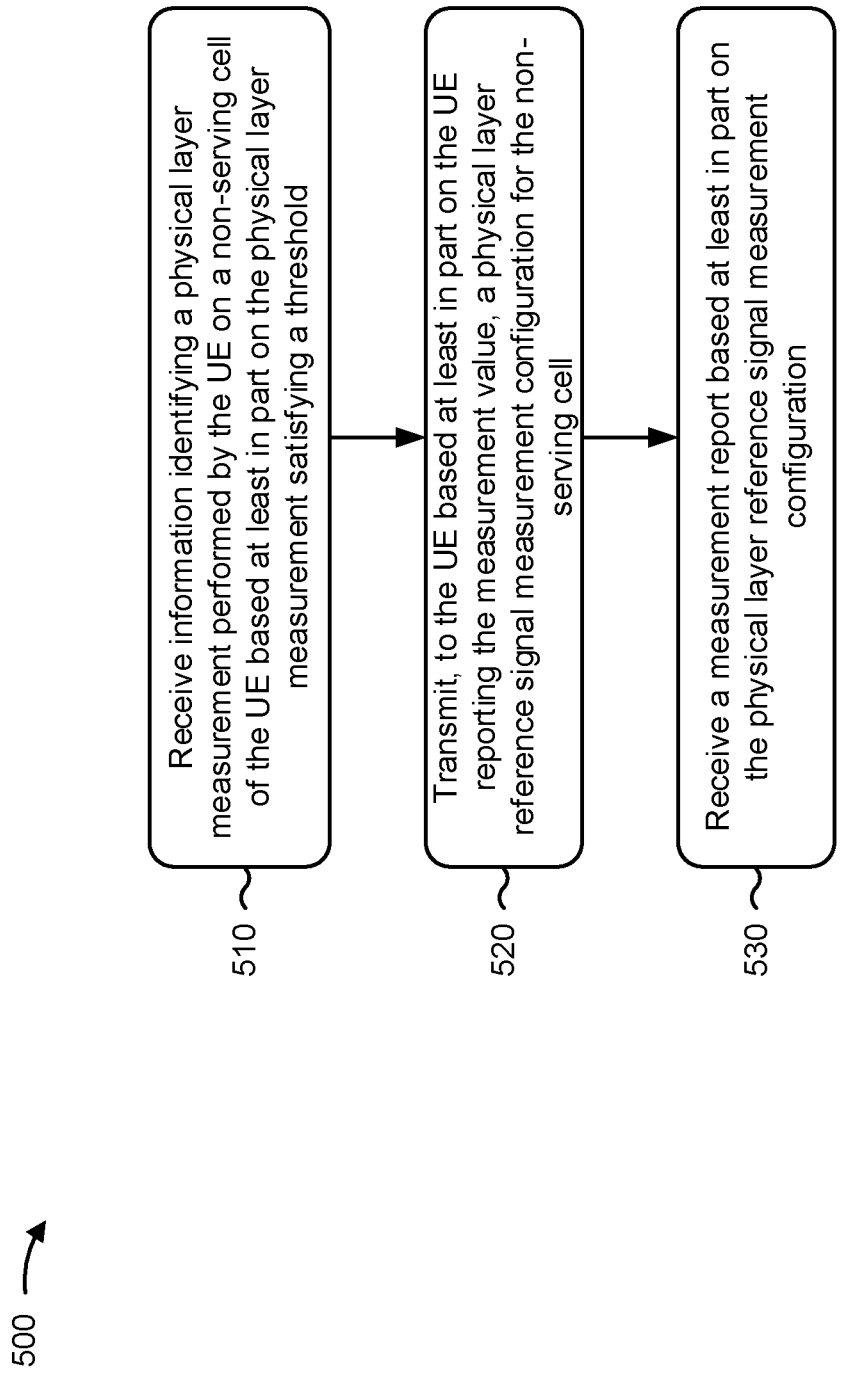
FIG. 5 is a flowchart illustrating an example process for Layer 1 measurement reporting performed by a BS in accordance with the present disclosure.

FIG. 5 is a flowchart illustrating an example process 500 performed, for example, by a base station, in accordance with the present disclosure. Example process 500 is an example where the base station (for example, base station 110 or a serving cell of a UE 120, among other examples) performs operations associated with Layer 1 measurement reporting for a neighbor cell.

As shown in FIG. 5, in some aspects, process 500 may include receiving information identifying a physical layer measurement performed by the UE on a non-serving cell of the UE based at least in part on the physical layer measurement satisfying a threshold (block 510). For example, the base station (such as by using antenna 234, DEMOD 232, MIMO detector 236, receive processor 238, or controller/processor 240) may receive information identifying a physical layer measurement performed by the UE on a non-serving cell based at least in part on the physical layer measurement satisfying a threshold, as described above.

As further shown in FIG. 5, in some aspects, process 500 may include transmitting, to the UE based at least in part on the UE reporting the measurement value, a physical layer reference signal measurement configuration for the non-serving cell (block 520). For example, the base station (such as by using controller/processor 240, transmit processor 220, TX MIMO processor 230, MOD 232, or antenna 234) may transmit, to the UE based at least in part on the UE reporting the physical layer measurement, a physical layer reference signal measurement configuration for the non-serving cell, as described above.

As further shown in FIG. 5, in some aspects, process 500 may include receiving a measurement report based at least in part on the physical layer reference signal measurement configuration (block 530). For example, the base station (such as by using antenna 234, DEMOD 232, MIMO detector 236, receive processor 238, or controller/processor 240) may receive a measurement report based at least in part on the physical layer reference signal measurement configuration, as described above.

Process 500 may include additional aspects, such as any single aspect or any combination of aspects described below or in connection with one or more other processes described elsewhere herein.

In a first aspect, the measurement report omits information identifying the non-serving cell, and process 500 further includes determining that the measurement report is associated with the non-serving cell based at least in part on having received the information identifying the physical layer measurement associated with the non-serving cell.

In a second additional aspect, alone or in combination with the first aspect, the non-serving cell is a neighbor cell of the UE.

In a third additional aspect, alone or in combination with one or more of the first and second aspects, process 500 includes configuring the threshold via at least one of: radio resource control signaling, medium access control signaling, or downlink control information.

In a fourth additional aspect, alone or in combination with one or more of the first through third aspects, the physical layer reference signal measurement configuration is associated with measuring a channel state information reference signal.

In a fifth additional aspect, alone or in combination with one or more of the first through fourth aspects, process 500 includes transmitting DCI that indicates the physical layer reference signal measurement configuration.

In a sixth additional aspect, alone or in combination with one or more of the first through fifth aspects, process 500 includes receiving the measurement report via a physical uplink control channel.

In a seventh additional aspect, alone or in combination with one or more of the first through sixth aspects, process 500 includes transmitting DCI that schedules a resource for the measurement report and that provides the physical layer reference signal measurement configuration.

In an eighth additional aspect, alone or in combination with one or more of the first through seventh aspects, process 500 includes transmitting first DCI that schedules a resource for the measurement report and second DCI that indicates the physical layer reference signal measurement configuration.

In a ninth additional aspect, alone or in combination with one or more of the first through eighth aspects, process 500 includes determining a resource for the measurement report relative to a measurement window associated with the physical layer reference signal measurement configuration based at least in part on a time gap indicated by a wireless communication standard.

In a tenth additional aspect, alone or in combination with one or more of the first through ninth aspects, the measurement report identifies a signal strength of the non-serving cell.

In an eleventh additional aspect, alone or in combination with one or more of the first through tenth aspects, receiving the measurement report includes receiving a physical uplink control channel that identifies the signal strength.

In a twelfth additional aspect, alone or in combination with one or more of the first through eleventh aspects, the signal strength is identified by at least one of a reference signal received power value, a reference signal received quality value, or a signal to interference plus noise ratio.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
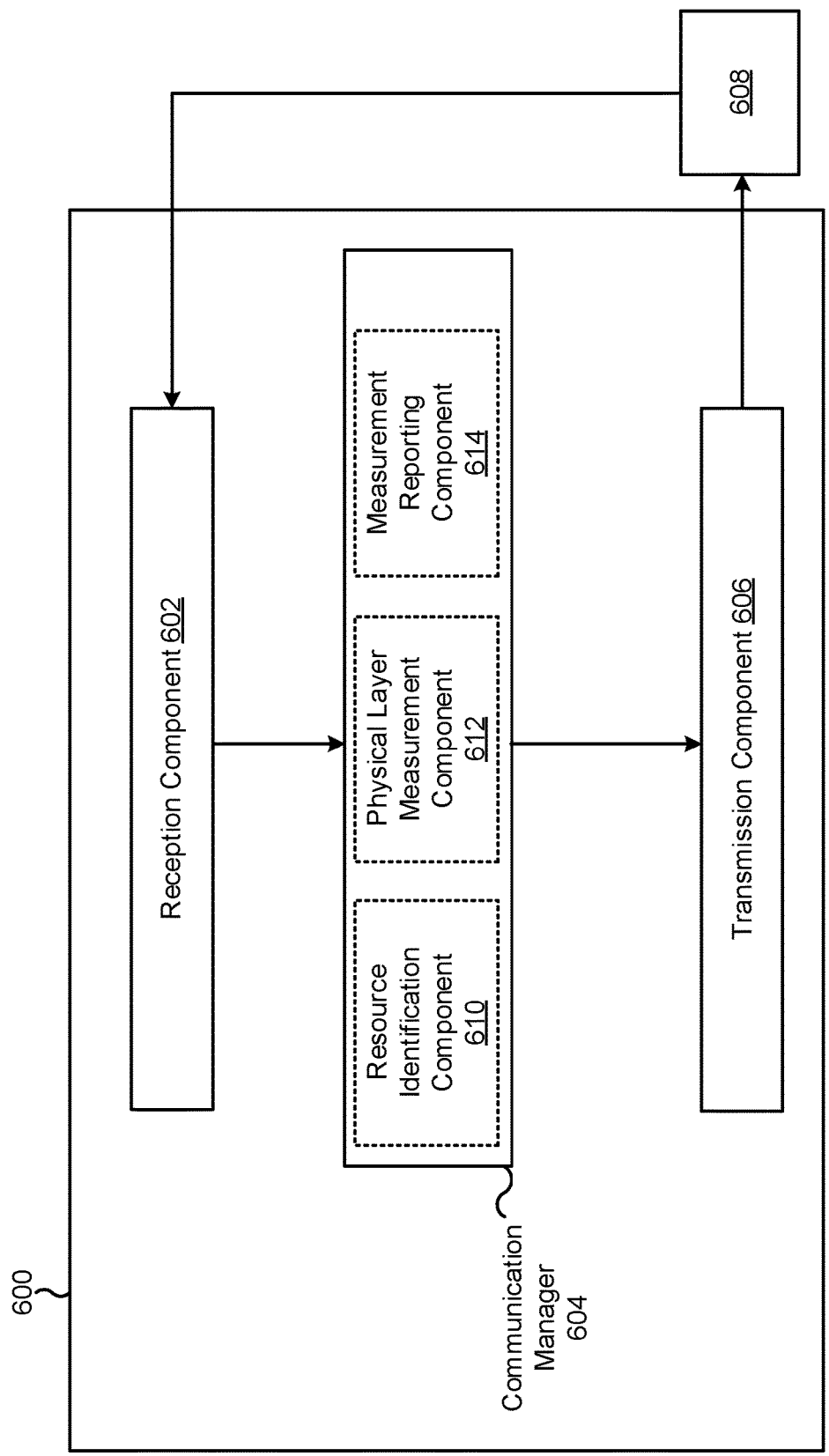
FIG. 6 is a diagram of an example apparatus for wireless communication in accordance with the present disclosure.

FIG. 6 is a block diagram of an example apparatus 600 for wireless communication. The apparatus 600 may be a UE, or a UE may include the apparatus 600. In some aspects, the apparatus 600 includes a reception component 602, a communication manager 604, and a transmission component 606, which may be in communication with one another (for example, via one or more buses). As shown, the apparatus 600 may communicate with another apparatus 608 (such as a UE, a base station, or another wireless communication device) using the reception component 602 and the transmission component 606.

In some aspects, the apparatus 600 may be configured to perform one or more operations described herein in connection with FIG. 3. Additionally or alternatively, the apparatus 600 may be configured to perform one or more processes described herein, such as process 400 of FIG. 4. In some aspects, the apparatus 600 may include one or more components of the UE described above in connection with FIG. 2.

The reception component 602 may receive communications, such as reference signals, control information, data communications, or a combination thereof, from the apparatus 608. The reception component 602 may provide received communications to one or more other components of the apparatus 600, such as the communication manager 604. In some aspects, the reception component 602 may perform signal processing on the received communications (such as filtering, amplification, demodulation, analog-to-digital conversion, demultiplexing, deinterleaving, de-mapping, equalization, interference cancellation, descrambling, or decoding, among other examples), and may provide the processed signals to the one or more other components. In some aspects, the reception component 602 may include one or more antennas, a demodulator, a MIMO detector, a receive processor, a controller/processor, a memory, or a combination thereof, of the UE described above in connection with FIG. 2.

The transmission component 606 may transmit communications, such as reference signals, control information, data communications, or a combination thereof, to the apparatus 608. In some aspects, the communication manager 604 may generate communications and may transmit the generated communications to the transmission component 606 for transmission to the apparatus 608. In some aspects, the transmission component 606 may perform signal processing on the generated communications (such as filtering, amplification, modulation, digital-to-analog conversion, multiplexing, interleaving, mapping, scrambling, or encoding, among other examples), and may transmit the processed signals to the apparatus 608. In some aspects, the transmission component 606 may include one or more antennas, a modulator, a transmit MIMO processor, a transmit processor, a controller/processor, a memory, or a combination thereof, of the UE described above in connection with FIG. 2. In some aspects, the transmission component 606 may be co-located with the reception component 602 in a transceiver.

The communication manager 604 may perform or may cause the reception component 602 to perform a physical layer measurement on a non-serving cell of the apparatus 600; may report or may cause the transmission component 606 to report a measurement value of the physical layer measurement to a serving cell of the UE based at least in part on the physical layer measurement satisfying a threshold; may receive or may cause the reception component 602 to receive, based at least in part on reporting the measurement value, a physical layer reference signal measurement configuration for the non-serving cell; may transmit or may cause the transmission component 606 to transmit a measurement report based at least in part on the physical layer reference signal measurement configuration; may receive or may cause the reception component 602 to receive a configuration indicating the threshold; may receive or may cause the reception component 602 to receive downlink control information that indicates the physical layer reference signal measurement configuration; may receive or may cause the reception component 602 to receive downlink control information that schedules a resource for the measurement report and that provides the physical layer reference signal measurement configuration; may receive or may cause the reception component 602 to receive first DCI scheduling a resource for the measurement report and second DCI indicating the physical layer reference signal measurement configuration. In some aspects, the communication manager 604 may include a controller/processor, a memory, or a combination thereof, of the UE described above in connection with FIG. 2.

In some aspects, the communication manager 604 may include a set of components, such as a resource identification component 610, a physical layer measurement component 612, and a measurement reporting component 614. Alternatively, the set of components may be separate and distinct from the communication manager 604. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The resource identification component 610 is configured to identify a resource for the measurement report relative to a measurement window associated with the physical layer reference signal measurement configuration based at least in part on a time gap indicated by a wireless communication standard.

The physical layer measurement component 612 is configured to perform, or cause the reception component 602 to perform, a physical layer measurement on a non-serving cell. In some aspects, the physical layer measurement component 612 is configured to perform, or cause the reception component 602 to perform, a reference signal measurement during a measurement gap used to tune between a frequency of the serving cell and a frequency of the reference signal measurement or during a configured duration.

The measurement reporting component 614 is configured to report, or cause the transmission component 606 to report a physical layer measurement and a measurement report. In some aspects, the measurement reporting component 614 is configured to transmit, or cause the transmission component 606 to transmit a physical uplink control channel that includes the measurement report. In some aspects, the measurement reporting component 614 is configured to transmit, or cause the transmission component 606 to transmit a physical uplink control channel that identifies the signal strength.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

Figure 7:
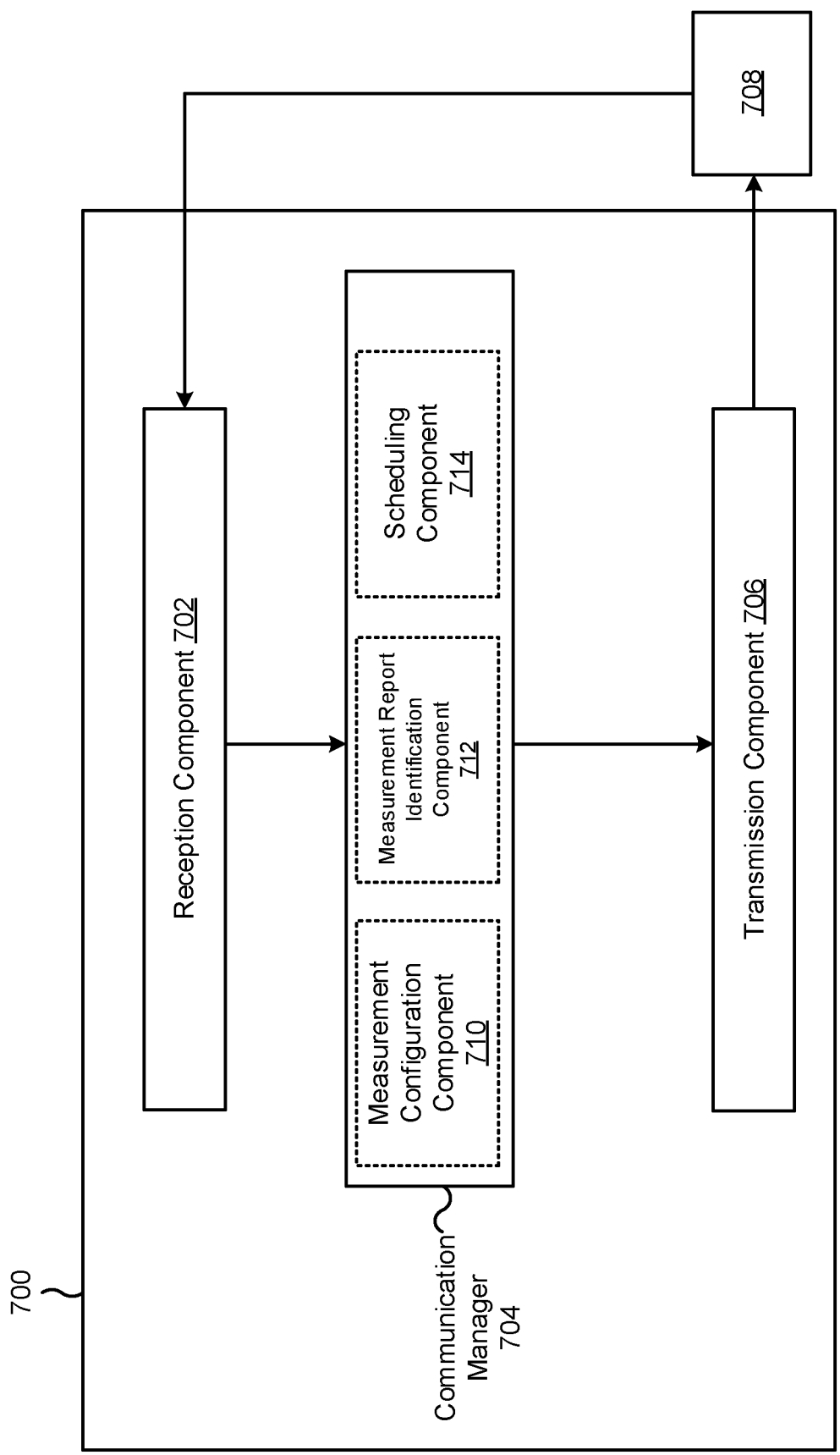
FIG. 7 is a diagram of an example apparatus for wireless communication in accordance with the present disclosure.

FIG. 7 is a block diagram of an example apparatus 700 for wireless communication. The apparatus 700 may be a base station, or a base station may include the apparatus 700. In some aspects, the apparatus 700 includes a reception component 702, a communication manager 704, and a transmission component 706, which may be in communication with one another (for example, via one or more buses). As shown, the apparatus 700 may communicate with another apparatus 708 (such as a UE, a base station, or another wireless communication device) using the reception component 702 and the transmission component 706.

In some aspects, the apparatus 700 may be configured to perform one or more operations described herein in connection with FIG. 3. Additionally or alternatively, the apparatus 700 may be configured to perform one or more processes described herein, such as process 500 of FIG. 5. In some aspects, the apparatus 700 may include one or more components of the base station described above in connection with FIG. 2.

The reception component 702 may receive communications, such as reference signals, control information, data communications, or a combination thereof, from the apparatus 708. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the base station described above in connection with FIG. 2.

The transmission component 706 may transmit communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of the base station described above in connection with FIG. 2. In some aspects, the transmission component 706 may be co-located with the reception component 702 in a transceiver.

The communication manager 704 may receive or may cause the reception component 702 to receive information identifying a measurement value of a physical layer measurement performed by a UE on a non-serving cell of the UE based at least in part on the physical layer measurement satisfying a threshold; or may receive or may cause the reception component 702 to receive a measurement report based at least in part on the physical layer reference signal measurement configuration. In some aspects, the communication manager 704 may include a controller/processor, a memory, a scheduler, a communication unit, or a combination thereof, of the base station described above in connection with FIG. 2.

In some aspects, the communication manager 704 may include a set of components, such as a measurement configuration component 710, a measurement report identification component 712, and a scheduling component 714. Alternatively, the set of components may be separate and distinct from the communication manager 704. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The measurement configuration component 710 may transmit or may cause the transmission component 706 to transmit to the UE based at least in part on the UE reporting the measurement value, a physical layer reference signal measurement configuration for the non-serving cell. In some aspects, the measurement configuration component 710 may configure or may cause the transmission component 706 to configure the threshold via at least one of radio resource control signaling, medium access control signaling, or downlink control information.

The measurement report identification component 712 may determine that the measurement report is associated with the non-serving cell based at least in part on having received the information identifying the physical layer measurement associated with the non-serving cell. The scheduling component 714 may determine a resource for the measurement report relative to a measurement window associated with the physical layer reference signal measurement configuration based at least in part on a time gap indicated by a wireless communication standard. In some aspects, the scheduling component 714 may transmit or may cause the transmission component 706 to transmit DCI that schedules a resource for the measurement report and that provides the physical layer reference signal measurement configuration. In some aspects, the scheduling component 714 may transmit or may cause the transmission component 706 to transmit first DCI that schedules a resource for the measurement report and second DCI that indicates the physical layer reference signal measurement configuration The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
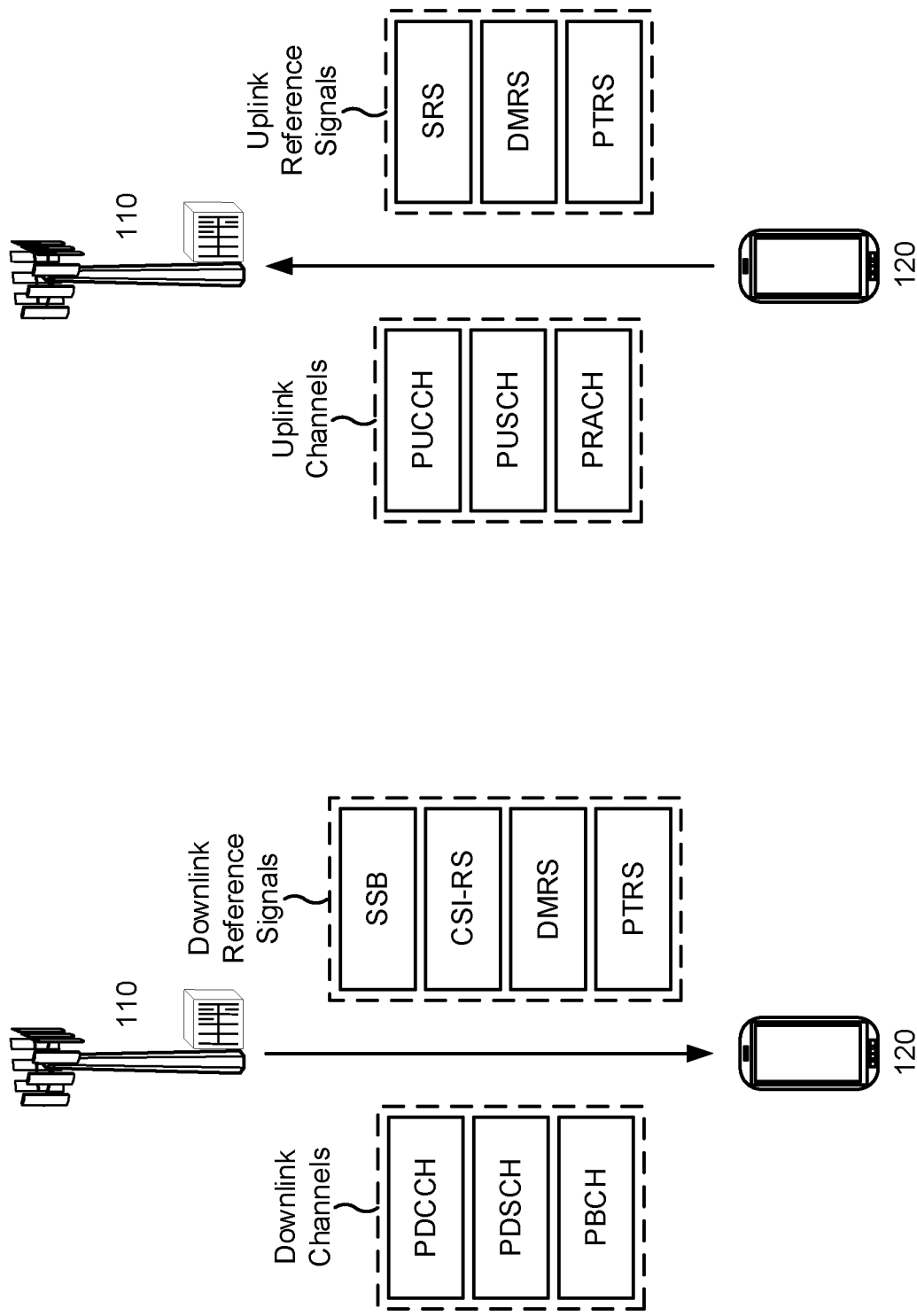
FIG. 8 is a diagram illustrating an example of physical channels and reference signals in a wireless network in accordance with the present disclosure.

FIG. 8 is a diagram illustrating an example of physical channels and reference signals in a wireless network in accordance with the present disclosure. As shown in FIG. 8, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (such as ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (such as for downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (such as in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (a rank), a precoding matrix (a precoder), a modulation and coding scheme (MCS), or a refined downlink beam (such as a using a beam refinement procedure or a beam management procedure), among other examples.

A DMRS may carry information used to estimate a radio channel for demodulation of an associated physical channel (such as a PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (such as on the PDSCH) and uplink communications (such as on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (such as a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (such as a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: performing a physical layer measurement on a non-serving cell of the UE; reporting a measurement value of the physical layer measurement to a serving cell of the UE based at least in part on the physical layer measurement satisfying a threshold; receiving, based at least in part on reporting the measurement value, a physical layer reference signal measurement configuration for the non-serving cell; and transmitting a measurement report based at least in part on the physical layer reference signal measurement configuration.

Aspect 2: The method of Aspect 1, wherein the measurement report omits information identifying the non-serving cell based at least in part on the UE having reported the measurement value to the serving cell.

Aspect 3: The method of Aspect 1, wherein the non-serving cell is a neighbor cell of the UE.

Aspect 4: The method of Aspect 1, wherein performing the physical layer measurement comprises tuning from a frequency of the serving cell to a frequency of a reference signal measurement during a measurement gap or a configured duration associated with physical-layer measurement on the non-serving cell; and performing the reference signal measurement at the frequency.

Aspect 5: The method of Aspect 1, further comprising receiving a configuration indicating the threshold via at least one of: radio resource control signaling, medium access control signaling, or downlink control information.

Aspect 6: The method of Aspect 1, further comprising receiving downlink control information that schedules a resource for the measurement report and that provides the physical layer reference signal measurement configuration.

Aspect 7: The method of Aspect 1, further comprising receiving first downlink control information (DCI) scheduling a resource for the measurement report and second DCI indicating the physical layer reference signal measurement configuration.

Aspect 8: The method of Aspect 1, further comprising determining a resource for the measurement report relative to a measurement window associated with the physical layer reference signal measurement configuration based at least in part on a time gap.

Aspect 9: The method of Aspect 1, wherein the measurement report identifies a signal strength of the non-serving cell, wherein the signal strength is identified by at least one of: a reference signal received power value, a reference signal received quality value, or a signal to interference plus noise ratio.

Aspect 10: The method of Aspect 1, wherein the threshold is a measurement value threshold and the method further comprises: comparing the measurement value of the physical layer measurement to the measurement value threshold, wherein reporting the measurement value is based at least in part on the measurement value satisfying the measurement value threshold.

Aspect 11: The method of Aspect 10, wherein the measurement value threshold is defined relative to a measurement value of a strongest beam associated with the UE or a measurement value of a beam associated with the serving cell of the UE.

Aspect 12: The method of Aspect 10, wherein the measurement value threshold is configured as a measurement value.

Aspect 13: A method of wireless communication performed by a base station associated with a serving cell of a user equipment (UE), comprising: receiving information identifying a measurement value of a physical layer measurement performed by the UE on a non-serving cell of the UE based at least in part on the physical layer measurement satisfying a threshold; transmitting, to the UE based at least in part on the UE reporting the measurement value, a physical layer reference signal measurement configuration for the non-serving cell; and receiving a measurement report based at least in part on the physical layer reference signal measurement configuration.

Aspect 14: The method of Aspect 13, wherein the measurement report omits information identifying the non-serving cell, and wherein the method further comprises: determining that the measurement report is associated with the non-serving cell based at least in part on having received the information identifying the physical layer measurement associated with the non-serving cell.

Aspect 15: The method of Aspect 13, further comprising: configuring the threshold via at least one of: radio resource control signaling, medium access control signaling, or downlink control information. medium access control signaling, or Aspect 16: The method of Aspect 13, further comprising transmitting downlink control information that indicates the physical layer reference signal measurement configuration.

Aspect 17: The method of Aspect 13, further comprising transmitting downlink control information (DCI) that schedules a resource for the measurement report and that provides the physical layer reference signal measurement configuration.

Aspect 18: The method of Aspect 13, further comprising transmitting first downlink control information (DCI) that schedules a resource for the measurement report and second DCI that indicates the physical layer reference signal measurement configuration.

Aspect 19: The method of Aspect 13, further comprising determining a resource for the measurement report relative to a measurement window associated with the physical layer reference signal measurement configuration based at least in part on a time gap.

Aspect 20: The method of Aspect 13, wherein the measurement report identifies a signal strength of the non-serving cell, wherein the signal strength is identified by at least one of: a reference signal received power value, a reference signal received quality value, or a signal to interference plus noise ratio.

Aspect 21: An apparatus for wireless communication at a device, comprising a processor; memory coupled with the processor; and instructions stored in the memory and executable by the processor to cause the apparatus to perform the method of one or more Aspects of Aspects 1-20.

Aspect 22: A device for wireless communication, comprising a memory and one or more processors coupled to the memory, the memory and the one or more processors configured to perform the method of one or more Aspects of Aspects 1-20.

Aspect 23: An apparatus for wireless communication, comprising at least one means for performing the method of one or more Aspects of Aspects 1-20.

Aspect 24: A non-transitory computer-readable medium storing code for wireless communication, the code comprising instructions executable by a processor to perform the method of one or more Aspects of Aspects 1-20.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-20.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer, depending on the context, to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
    performing a physical layer measurement on a non-serving cell of the UE;
    reporting, to a serving cell of the UE, a measurement value for the non-serving cell in accordance with the physical layer measurement satisfying a threshold;
    receiving, in accordance with reporting the measurement value, first downlink control information (DCI) indicating a physical layer reference signal measurement configuration for the non-serving cell and second DCI scheduling a resource for a measurement report; and
    transmitting the measurement report in accordance with the physical layer reference signal measurement configuration.

2. The method of claim 1, wherein the measurement report omits information identifying the non-serving cell in accordance with the UE having reported the measurement value to the serving cell.

3. The method of claim 1, wherein the non-serving cell is a neighbor cell of the UE.

4. The method of claim 1, wherein performing the physical layer measurement comprises tuning from a frequency of the serving cell to a frequency of a reference signal measurement during a measurement gap or a configured duration associated with physical-layer measurement on the non-serving cell; and
    performing the reference signal measurement at the frequency.

5. The method of claim 1, further comprising receiving a configuration indicating the threshold via at least one of:
    radio resource control signaling,
    medium access control signaling, or
    downlink control information.

6. The method of claim 1, further comprising receiving downlink control information that schedules a resource for the measurement report and that provides the physical layer reference signal measurement configuration.

7. The method of claim 1, further comprising determining a resource for the measurement report relative to a measurement window associated with the physical layer reference signal measurement configuration associated with a time gap.

8. The method of claim 1, wherein the measurement report identifies a signal strength of the non-serving cell, and the signal strength is identified by at least one of:
    a reference signal received power value,
    a reference signal received quality value, or
    a signal to interference plus noise ratio.

9. The method of claim 1, wherein the threshold is a measurement value threshold and the method further comprises:
    comparing the measurement value of the physical layer measurement to the measurement value threshold, the reporting the measurement value performed in accordance with the measurement value satisfying the measurement value threshold.

10. The method of claim 9, wherein the measurement value threshold is defined relative to a measurement value of a strongest beam associated with the UE or a measurement value of a beam associated with the serving cell of the UE.

11. The method of claim 9, wherein the measurement value threshold is configured as a measurement value.

12. A method of wireless communication performed by a base station associated with a serving cell of a user equipment (UE), comprising:
    receiving, from the UE, information identifying a measurement value for a non-serving cell of the UE in accordance with a physical layer measurement, associated with the measurement value, satisfying a threshold;
    transmitting, to the UE in accordance with the UE reporting the measurement value, first downlink control information (DCI) indicating a physical layer reference signal measurement configuration for the non-serving cell and second DCI scheduling a resource for a measurement report; and receiving the measurement report in accordance with the physical layer reference signal measurement configuration.

13. The method of claim 12, wherein the measurement report omits information identifying the non-serving cell, and the method further comprising:
determining that the measurement report is associated with the non-serving cell in accordance with the base station having received the information identifying the measurement value.

14. The method of claim 12, further comprising:
configuring the threshold via at least one of:
radio resource control signaling,
medium access control signaling, or
downlink control information.

15. The method of claim 12, further comprising transmitting downlink control information that indicates the physical layer reference signal measurement configuration.

16. The method of claim 12, further comprising transmitting downlink control information (DCI) that schedules a resource for the measurement report and that provides the physical layer reference signal measurement configuration.

17. The method of claim 12, further comprising determining a resource for the measurement report relative to a measurement window associated with the physical layer reference signal measurement configuration associated with a time gap.

18. The method of claim 12, wherein the measurement report identifies a signal strength of the non-serving cell, and the signal strength is identified by at least one of:
a reference signal received power value,
a reference signal received quality value, or
a signal to interference plus noise ratio.

19. A user equipment (UE) for wireless communication, comprising:
a processing system that includes processor circuitry and memory circuitry that stores code, the processing system configured to cause the UE to:
perform a physical layer measurement on a non-serving cell of the UE;
report, to a serving cell of the UE, a measurement value for the non-serving cell in accordance with the physical layer measurement satisfying a threshold;
receive, in accordance with reporting the measurement value, first downlink control information (DCI) indicating a physical layer reference signal measurement configuration for the non-serving cell and second DCI scheduling a resource for a measurement report; and
transmit the measurement report in accordance with the physical layer reference signal measurement configuration.

20. The UE of claim 19, wherein the measurement report omits information identifying the non-serving cell in accordance with the UE having reported the measurement value to the serving cell.

21. The UE of claim 19, wherein the processing system is configured to receive downlink control information that schedules a resource for the measurement report and that provides the physical layer reference signal measurement configuration.

22. The UE of claim 19, wherein the threshold is a measurement value threshold, and the processing system is configured to:
compare the measurement value of the physical layer measurement to the measurement value threshold, the one or more processors, when reporting the measurement value, being configured to report the measurement value in accordance with the measurement value satisfying the measurement value threshold.

23. The UE of claim 22, wherein the measurement value threshold is defined relative to a measurement value of a strongest beam associated with the UE or a measurement value of a beam associated with the serving cell of the UE.

24. The UE of claim 22, wherein the measurement value threshold is configured as a measurement value.

25. The UE of claim 19, wherein the processing system is configured to determine a resource for the measurement report relative to a measurement window associated with the physical layer reference signal measurement configuration associated with a time gap.

26. The UE of claim 19, wherein the measurement report identifies a signal strength of the non-serving cell, and the signal strength is identified by at least one of:
a reference signal received power value,
a reference signal received quality value, or
a signal to interference plus noise ratio.

27. A base station for wireless communication associated with a serving cell of a user equipment (UE), comprising:
a processing system that includes processor circuitry and memory circuitry that stores code, the processing system configured to cause the UE to:
receive, from the UE, information identifying a measurement value for a non-serving cell in accordance with a physical layer measurement, associated with the measurement value, satisfying a threshold;
transmit, to the UE in accordance with the UE reporting the physical layer measurement, first downlink control information (DCI) indicating a physical layer reference signal measurement configuration for the non-serving cell and second DCI scheduling a resource for a measurement report; and
receive the measurement report in accordance with the physical layer reference signal measurement configuration.

28. The base station of claim 27, wherein the measurement report omits information identifying the non-serving cell, and the processing system is configured to:
determine that the measurement report is associated with the non-serving cell in accordance with the base station having received the information identifying the measurement value.

29. The base station of claim 27, wherein the threshold is defined relative to a measurement value of a strongest beam associated with the UE or a measurement value of a beam associated with the serving cell of the UE.

30. The base station of claim 27, wherein the measurement report identifies a signal strength of the non-serving cell, and the signal strength is identified by at least one of:
a reference signal received power value,
a reference signal received quality value, or
a signal to interference plus noise ratio.

* * * * *